Feb. 14, 1950 W. T. ALLEN 2,497,148
WHEEL ADJUSTING AND REMOVING DEVICE
Filed April 1, 1947
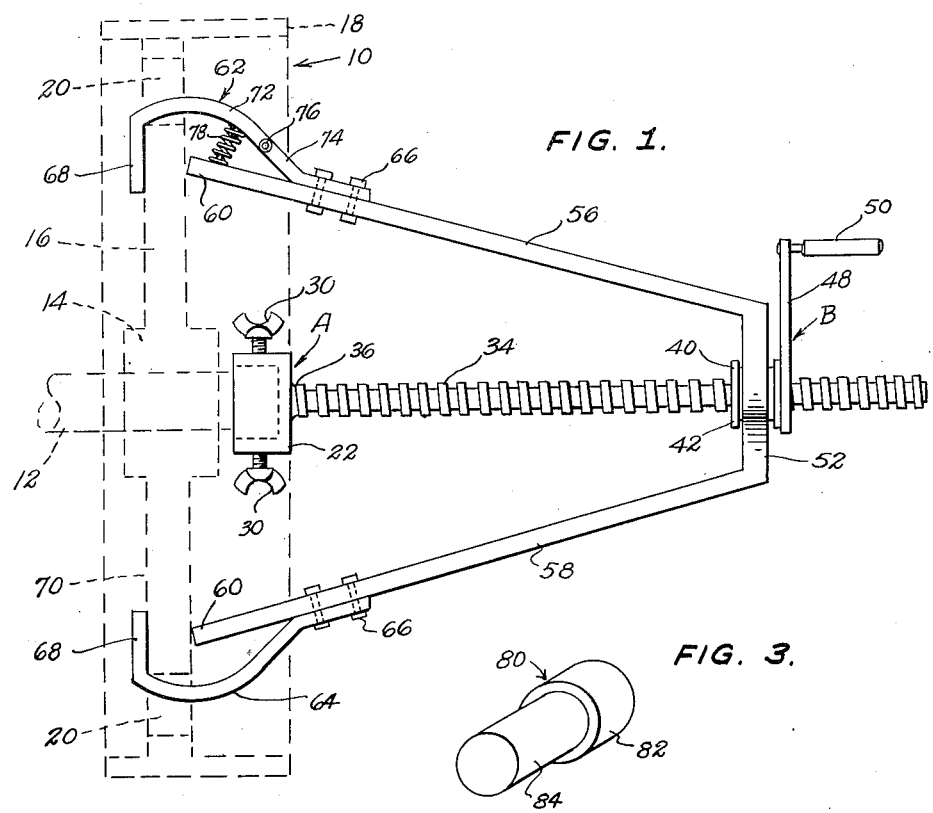
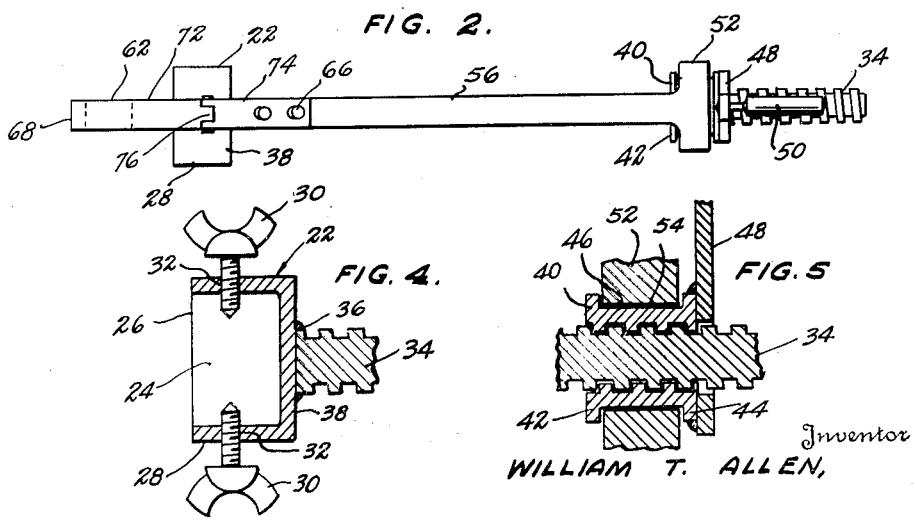
Inventor
WILLIAM T. ALLEN,
By McMorrow, Berman & Davidson
Attorneys Patented Feb. 14, 1950

2,497,148

UNITED STATES PATENT OFFICE 2,497,148

WHEEL ADJUSTING AND REMOVING DEVICE

William T. Allen, Calvert City, Ky.

Application April 1, 1947, Serial No. 738,668

1 Claim. (Cl. 29—283)

This invention relates to devices for adjusting and removing wheels on vehicles.

An object of the invention is to provide a device for use on wheeled vehicles such as tractors and the like, whereby the wheels and the axle may be engaged and the wheels moved along the axle, to adjust their relative spacing.

Another object of the invention is to provide a device whereby the rear wheels of tractors may be easily and quickly removed from the axles.

A further object of the invention is to provide a tractor wheel adjusting and removing device which is simple in design, inexpensive to manufacture, and which is effective in operation.

Other objects and advantages of the invention will become apparent from the following description of a preferred embodiment thereof as illustrated in the accompanying drawings, and in which:

Figure 1 is a side elevational view of my improved device shown in relation to a tractor wheel and axle with which it is engaged.

Figure 2 is a top plan view of the device shown in Figure 1, apart from the wheel and axle.

Figure 3 is a perspective view of an axle extension adapted for use with the device.

Figure 4 is a fragmentary sectional view of the axle engaging portion of the device shown in Figure 1, the view being taken at location A, and Figure 5 is a fragmentary sectional view taken at location B of Figure 1, and showing the cooperating parts located thereat.

In the use of tractors, it is frequently necessary to vary the spacing between the rear wheels, this being done on such tractors as the H. and M. Model International Farmall tractors and many other models. Some farm tools, such as the turning plow, require the wheels to be adjusted to as little spacing between them as possible, whereas other tools such as cultivators, require the spacing between the wheels to be quite large. The process of adjusting the spacing between the wheels is normally a difficult job, frequently requiring several hours of hard, costly labor. However, by use of my invention, such work may be completed in only a few minutes.

In order to understand clearly the nature of the invention, and the best means for carrying it out, references may now be had to the drawings, in which like numerals denote similar parts throughout the several views. A tractor rear wheel is indicated at 10 in Figure 1, being mounted upon the tractor axle 12, the axle extending snugly through the wheel hub 14. A web 16 extends radially towards from the hub and thus carries the wheel rim 18, the web being cut away at a number of angular locations 20 to form openings therein.

In order to either remove the wheel from the axle, or to change its position longitudinally of the axle, I provide the apparatus described and shown herein. An axle-engaging cup 22 has a cylindrical recess 24 formed therein, the recess being open at one end 26 of the cylindrical wall 28 to receive the end portion of the axle 12. Wing screws 30 are threaded through radial bores 32 in the wall 28, their inner ends extending into the recess 24 whereby upon tightly screwing the screws inwardly the axle is securely engaged by the cup 22.

A threaded shaft 34 has its end 36 welded to the end wall 38 of the cup 22, the shaft, cup and axle 12 thus being coaxial. A nut 40 is threaded onto the shaft 34, being provided with spaced radial flanges 42 and 44 defining an annular groove 46 therebetween. A crank 48 is securely welded to the flange 44 as best shown in Figure 5, so as to permit the nut 40 to be turned by grasping the crank handle 50.

A cross bar 52 has a bore 54 formed therein intermediate its ends to receive the grooved portion 46 of the nut 40, the nut being freely rotatable in the bore 54. Divergent legs 56 and 58 are either secured at one end to the outer ends of the cross bar 52 or are formed integral therewith, the outer ends 60 of the legs serving to bear against the wheel web 16.

Hooks 62 and 64 are secured at one end to the legs 56 and 58 respectively, by means of rivets 66, as shown in Figures 1 and 2, the outer ends 68 of the hooks being bent inwardly as shown in Figure 1, to extend through the wheel web apertures 20 and engage the web from the other side 70 thereof, thus permitting tension toward the right as seen in the view to be applied for pulling the wheel to the right on the axle.

The upper hook 62 is formed in two parts 72 and 74 which are hinged together at 76 by means of a pivot pin extending through bores formed in their tongued and grooved ends shown in Figure 2, the tension spring 78 engaging the part 72 of the hook and the outer end portion 60 of the leg 56, to bias the hook portion 72 in a counterclockwise direction. By this means, the wheel may be easily engaged and disengaged, the lower hook 64 being first inserted through an aperture 20 and the upper hook portion 72 being tilted upwards and yielding against the spring tension to clear the lower edge of the upper aperture 20, and then being allowed to grip the wheel web, It will be seen that turning the crank 48 in a clockwise direction as seen from the left in Figure 1, will move the nut 40 with legs 56 and 58 toward the left of the view, moving the wheel leftwards on the axle 12, and that turning the crank in the opposite direction will move the wheel toward the right longitudinally of the axle 12.

To permit removal of the wheel from the axle, I provide an axle extension 80 which is enlarged at 82 for engagement in the recess 24 of the cup 22, and has a shank 84 adapted to abut the end of the axle 12, and push it inside the hub of the wheel thus allowing pressure to be applied against the end of the axle to remove the wheel therefrom. The shank 84 allows the axle to be pressed out of the hub 14. From the above description, it will be apparent that use of the invention will permit traction wheels to be easily and quickly removed or adjusted with practically no effort on the part of the operator.

Although I have described a preferred embodiment of my invention in specific terms, it is to be understood that various changes may be made in size, shape, materials and arrangement without departing from the spirit and scope of the invention as claimed.

I claim:

A grapple adapted to transmit a pushing or pulling force to an article comprising a U-shaped frame embodying a connecting portion and spaced arms diametrically oppositely arranged with respect to the center line of said connecting portion, the free ends of said arms adapted to engage the face of an article to transmit a pushing force, a curved hook secured to the free end of each arm, the curved portion thereof extending beyond the free end of the arm and being spaced therefrom to engage the rear face of the article to transmit a pulling action thereon, one of said hooks having a pivoted connection with its arm whereby the hook may swing generally radially inwardly and outwardly with respect to the arm, a spring arranged between the last named hook and arm and connected therewith and serving to bias the last named hook radially inwardly toward the adjacent arm.

WILLIAM T. ALLEN.

REFERENCES CITED

The following references are of record in the file of this patent:

UNITED STATES PATENTS

| Number | Name | Date |
| --- | --- | --- |
| 186,229 | Casterline | Jan. 16, 1877 |
| 788,287 | Swanson | Apr. 25, 1905 |
| 844,469 | Prouty | Feb. 19, 1907 |
| 1,157,577 | Nickolai | Oct. 19, 1915 |
| 1,476,692 | Crane | Dec. 11, 1923 |
| 1,589,633 | Dunton et al. | June 22, 1926 |
| 2,252,036 | Rummer | Aug. 12, 1941 |
| 2,461,983 | Jarrett | Feb. 15, 1949 |

FOREIGN PATENTS

| Number | Country | Date |
| --- | --- | --- |
| 643,052 | France | Sept. 10, 1928 |